Oct. 5, 1954   C. J. GREINER ET AL   2,690,597
METHOD AND APPARATUS FOR MAKING CATAMENIAL TAMPONS
Filed July 1, 1948   7 Sheets-Sheet 1

Inventors:
Charles J. Greiner
John M. Graef
Howard A. Collins
William H. Burger
Reinhardt N. Sabee
By: Soans, Paul + Anderson   Attys.

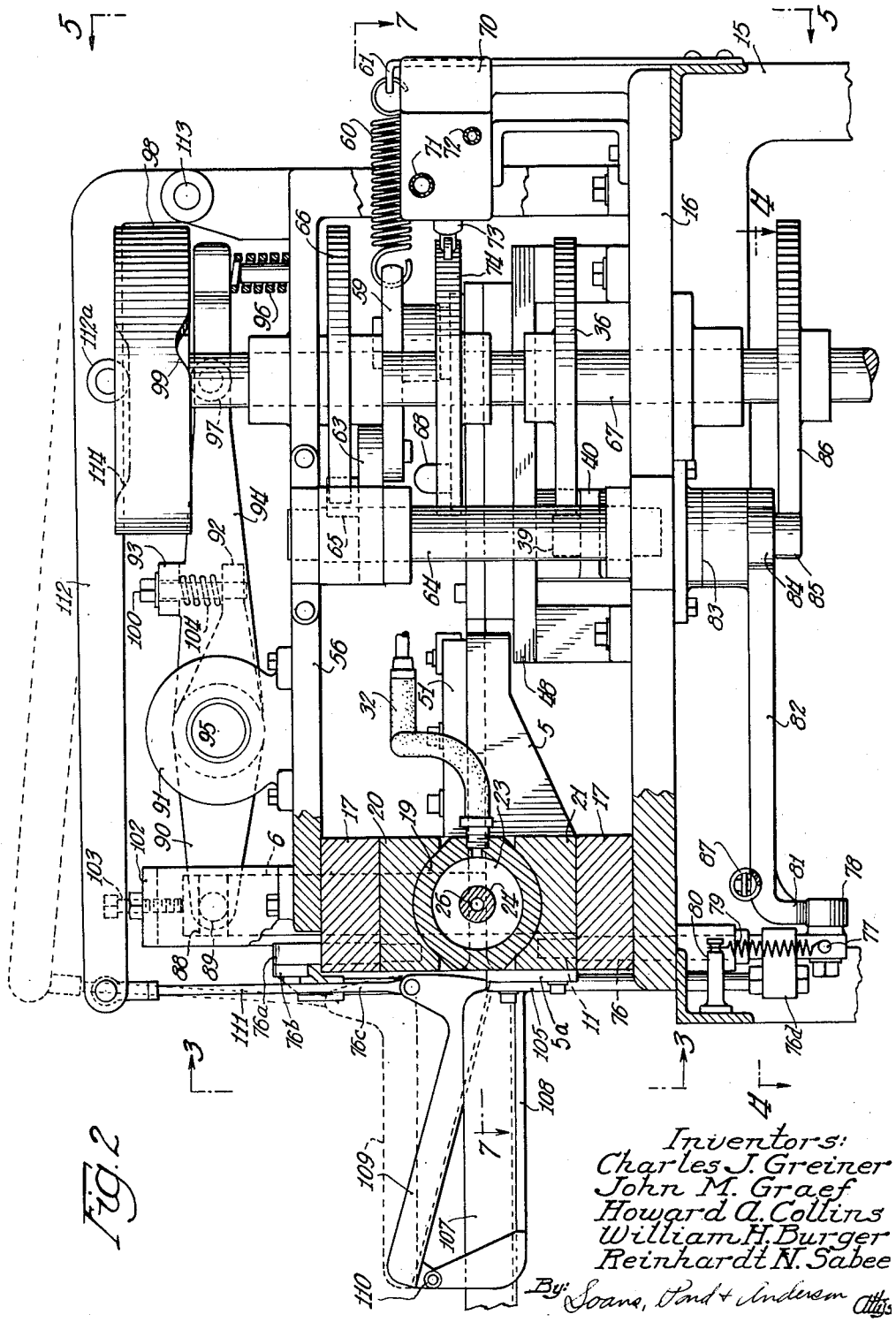

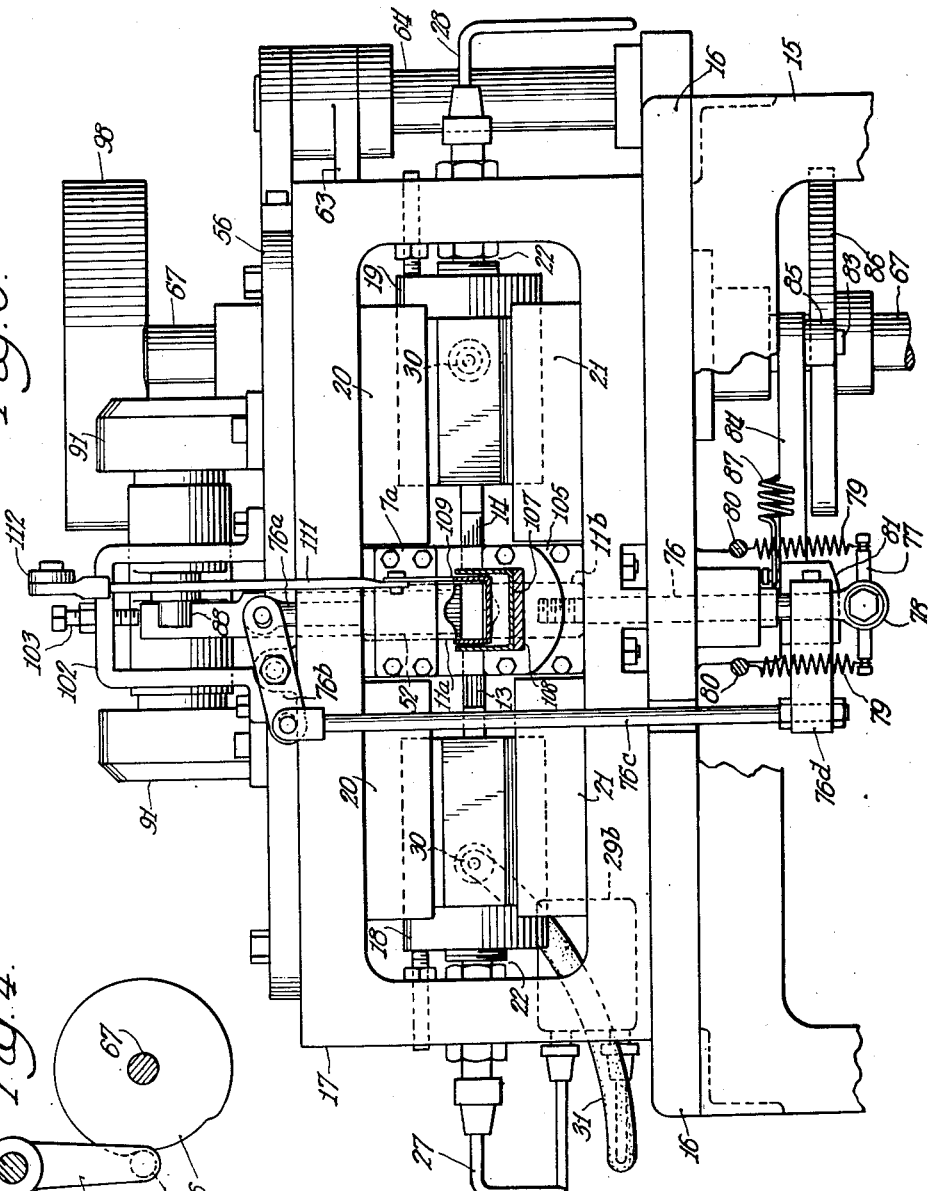

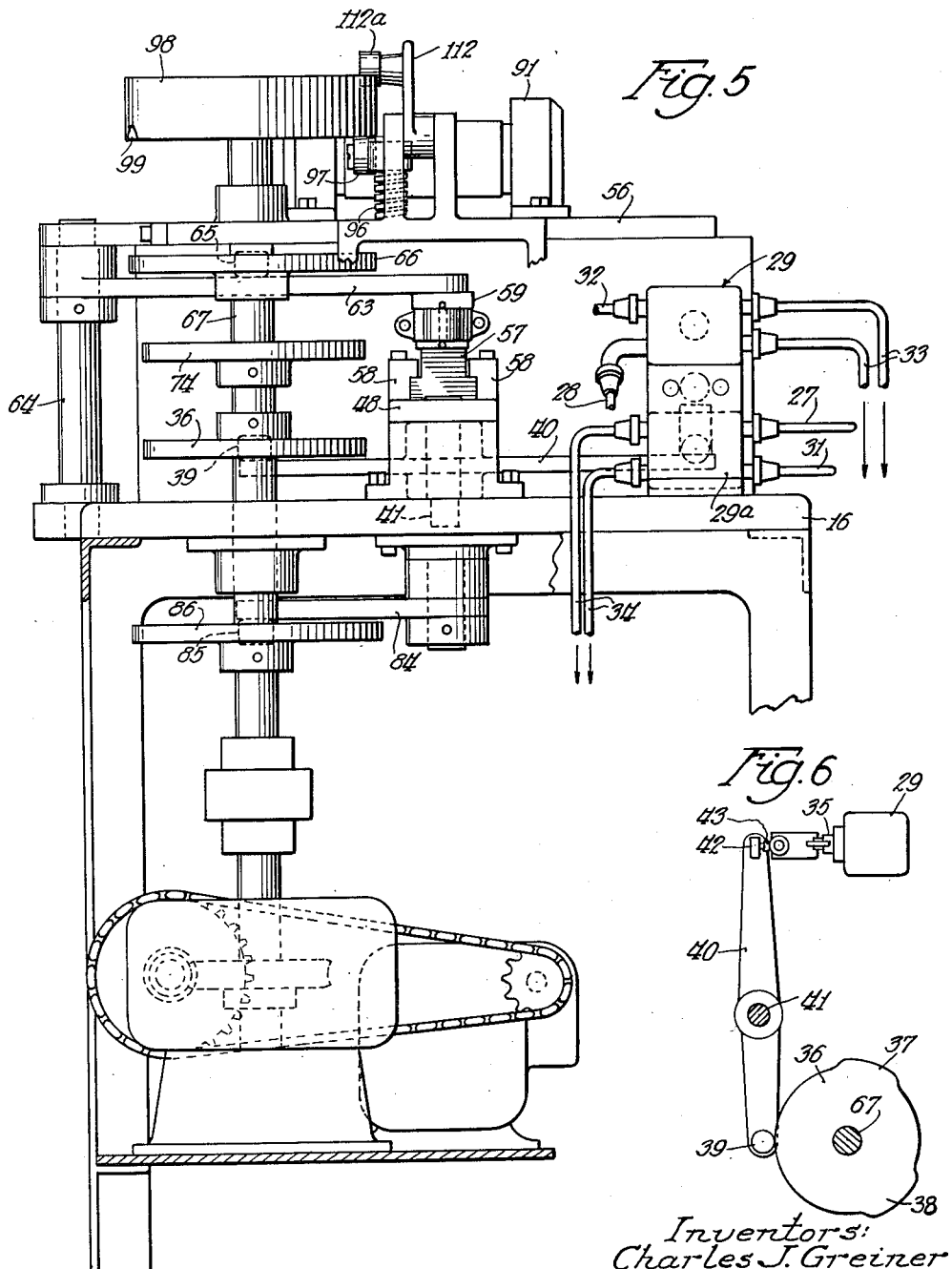

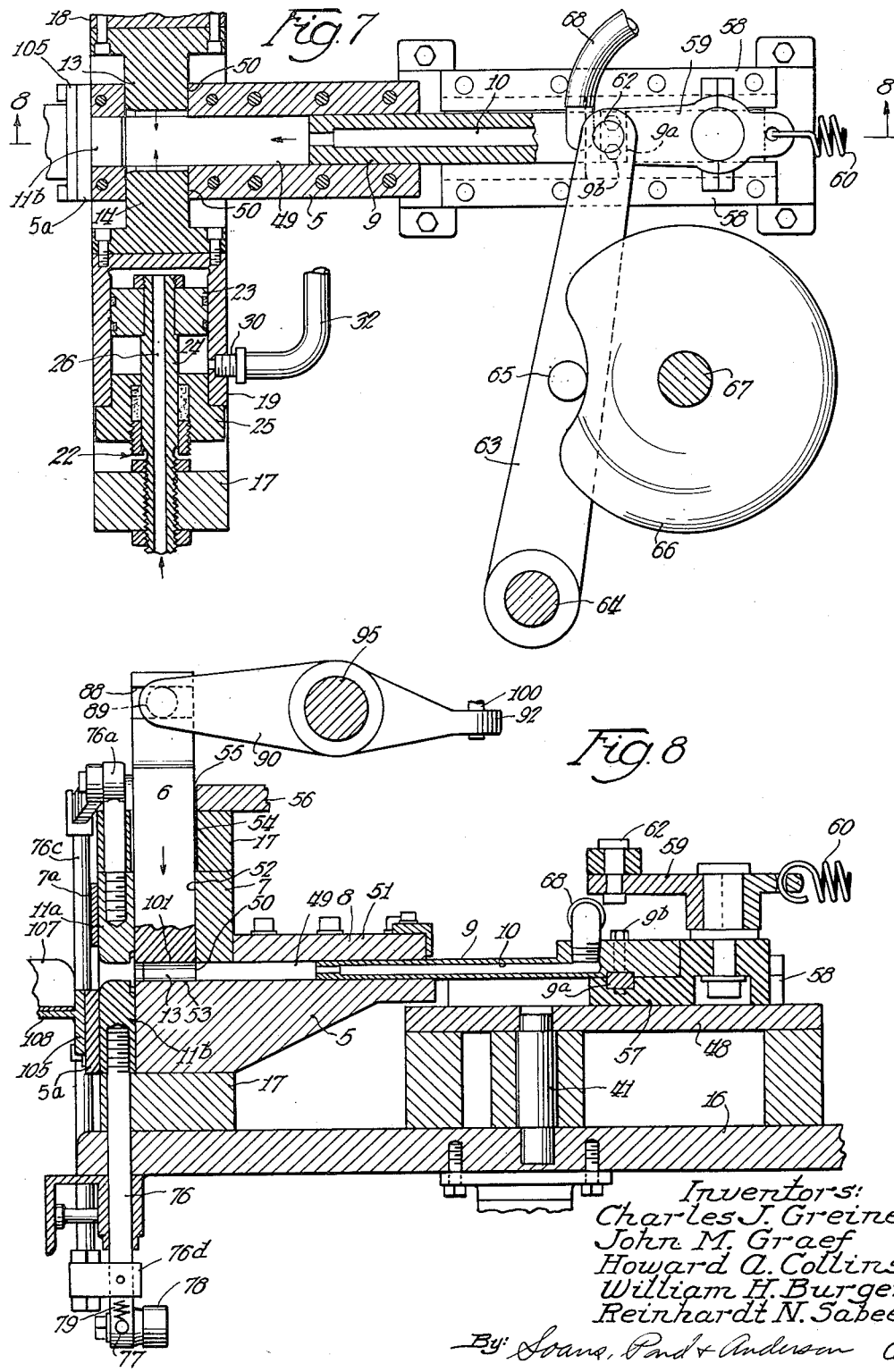

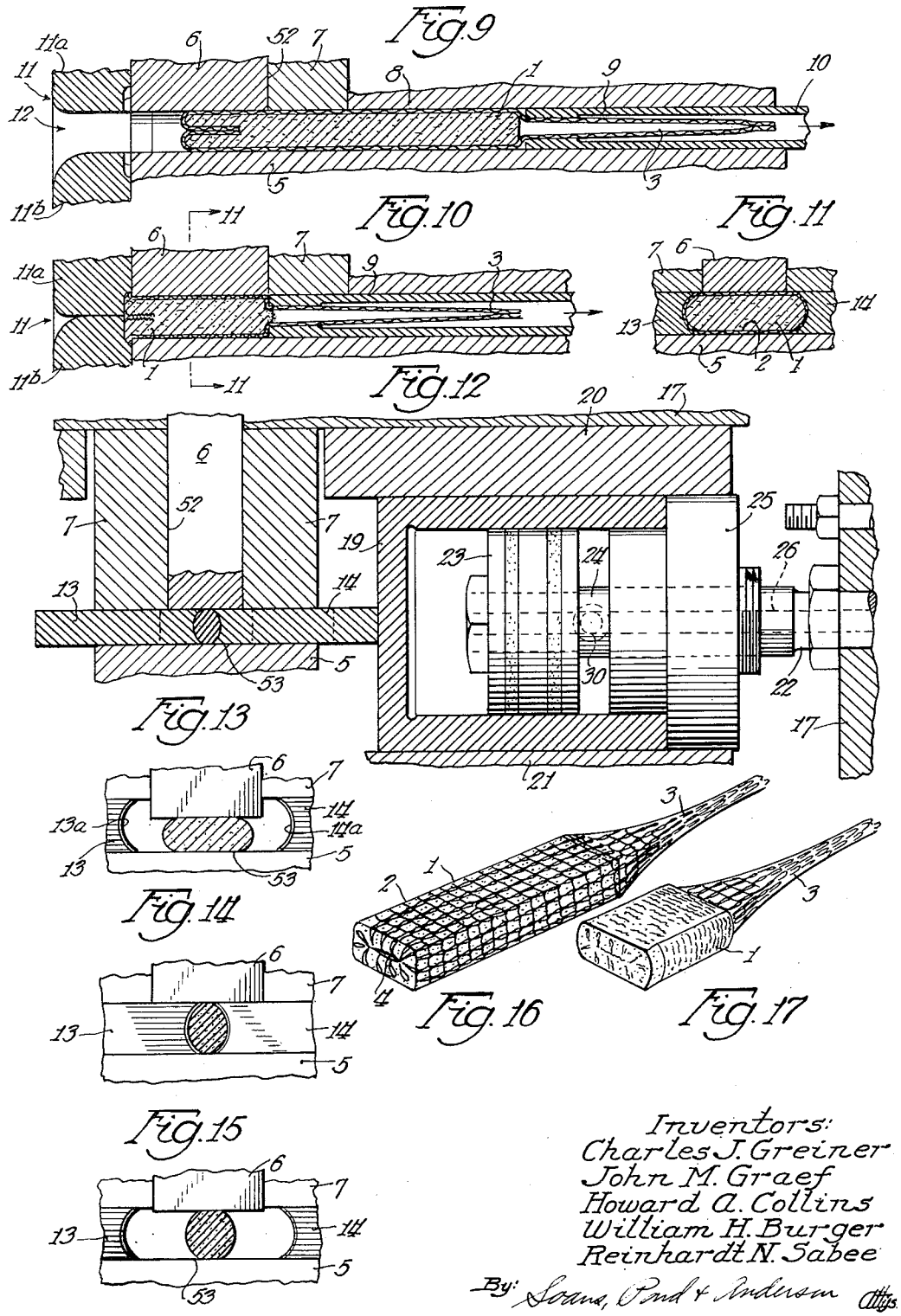

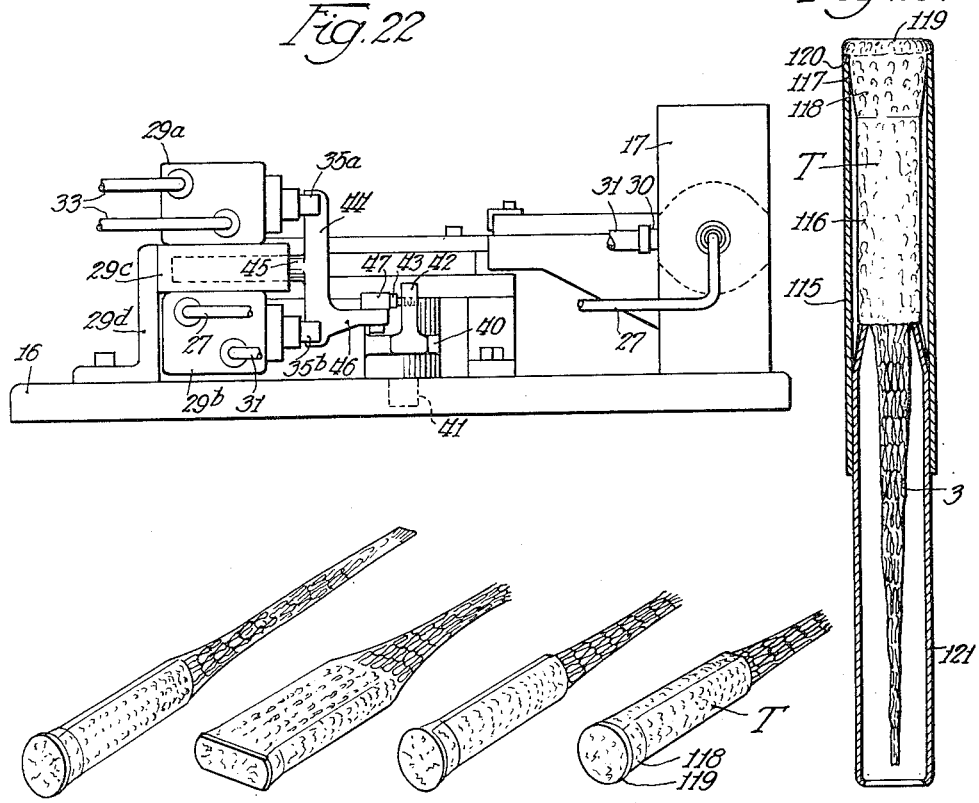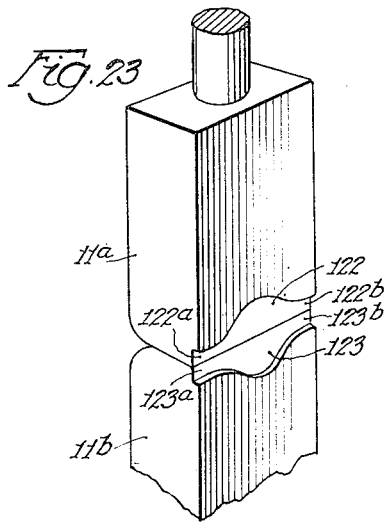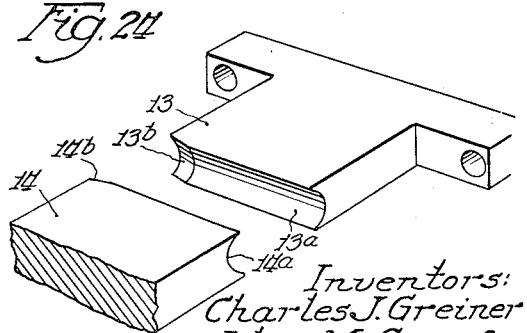

Patented Oct. 5, 1954

2,690,597

UNITED STATES PATENT OFFICE 2,690,597

METHOD AND APPARATUS FOR MAKING CATAMENIAL TAMPONS

Charles J. Greiner, Menasha, and John M. Graef, Howard A. Collins, and William H. Burger, Neenah, and Reinhardt N. Sabee, Appleton, Wis., assignors to International Cellucotton Products Company, Chicago, Ill., a corporation of Delaware Application July 1, 1948, Serial No. 36,478

20 Claims. (Cl. 19—144.5)

This invention relates to the manufacture of catamenial tampons, and it is concerned particularly with a tampon having a body of compressed, absorbent material, and a method and apparatus for compressing pre-formed uncompressed absorbent tampon bodies which are enclosed in a pervious material jacket.

One of the objects of the invention is to provide a tampon of the compressed character indicated, which will be easily insertable into the vaginal cavity and which tampon, upon being wetted by menstrual fluid, will quickly expand—especially transversely—to fully occupy the cavity so as to prevent leakage of the menstrual fluid past the tampon. Another object is to provide a tampon which may be easily assembled with an applicator and which will stay in place in the holder until it is intentionally ejected therefrom. Still another object is to provide a tampon which, although highly compressed and very dense, nevertheless embodies a very desirable softness characteristic.

Other important objects of the invention are to provide an efficient method and apparatus for compressing cotton and similar uncompressed tampon bodies to produce tampons of the above indicated character; to provide a method and apparatus which will so compress an uncompressed absorbent material tampon body to the desired reduced size, that the compressed or compacted body will maintain its reduced size so long as kept approximately dry, but from which it will readily reexpand when wetted as when placed in use; to provide a tampon body compressing method and apparatus which will be operative as aforesaid notwithstanding the presence of a jacket extension from one end of the tampon body, which ultimately constitutes the tampon withdrawal string; to provide such a compressing method and apparatus which will effectively compress the tampon body proper but which will not injure the jacket extension which forms the draw string; to provide a method and apparatus for forming a compressed tampon body which, although dense enough to be self-retentive in compressed condition, nevertheless embodies a desirable softness characteristic as aforesaid and, in general, it is the object of the invention to provide an improved tampon and an improved method and apparatus for making the same.

Other objects and advantages of the invention will be understood by reference to the following specification and accompanying drawings (7 sheets) wherein there is illustrated a selected form of tampon compressing apparatus embodying the invention, and whereby the improved method may be efficiently practiced.

In the drawings,

Fig. 2 is a section on an irregular plane represented by the line 2—2 of Fig. 1;

Figure 1:
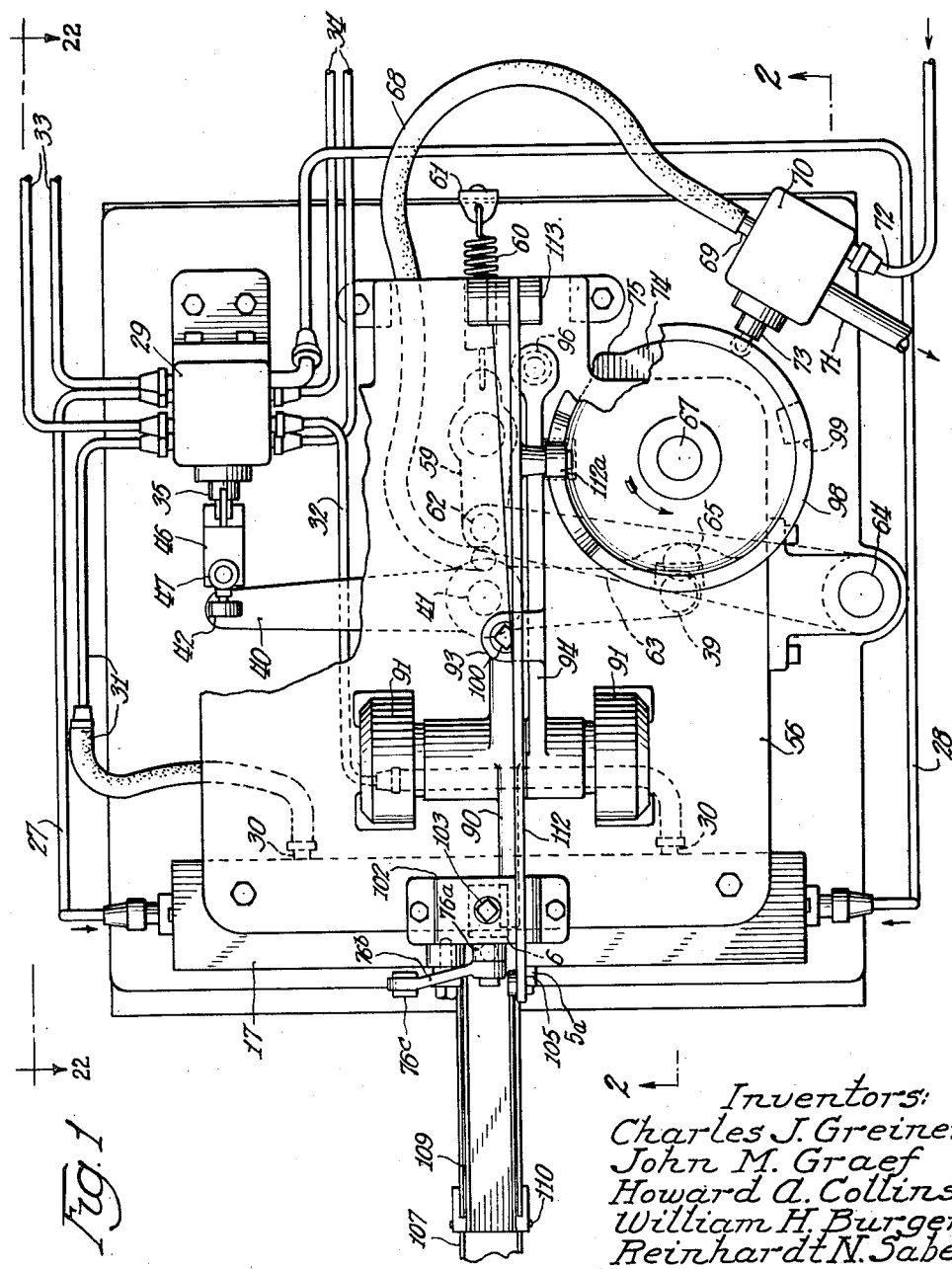
Fig. 1 is a plan.

Figs. 3, 4 and 5 are views on the lines 3—3 and 4—4 and 5—5 respectively of Fig. 2, Fig. 4 being on a reduced scale;

Fig. 6 is a fragmentary illustration of certain details appearing in part in Fig. 1;

Fig. 7 is a fragmentary plan section approximately on the plane represented by the line 7—7 of Fig. 2;

Fig. 8 is a section on the line 8—8 of Fig. 7;

Fig. 9 is a fragmentary section corresponding to a portion of Fig. 8 but illustrating the parts on an enlarged scale, and with an uncompressed tampon body in place in the mechanism preparatory to being compressed thereby;

Fig. 10 is a fragmentary section corresponding to a portion of Fig. 9, but showing the parts in a changed position;

Fig. 11 is a section on the line 11—11 of Fig. 10;

Fig. 12 is a section corresponding in part to Fig. 11 but showing the parts in a changed position together with certain actuating parts of the mechanism;

Figs. 13, 14 and 15 are more or less diagrammatic illustrations of certain steps in the operation of the mechanism;

Figs. 16 to 21 inclusive illustrate successive manufacturing stages of a tampon produced in accordance with the present invention;

Fig. 22 is an elevation on the line 22—22 of Fig. 1;

Figs. 23 and 24 are perspective illustrations of certain parts of the mechanism which, at least in part, determine the shape of the tampon produced by the illustrated mechanism, and Fig. 25 is a cross section through a tampon and applicator therefor, the tampon being made in accordance with the present invention.

The body structure, as shown in Fig. 16, consists of an elongated rectangular section 1 of absorbent material, such as cotton, cellulose or the like in a loose, fluffy and uncompressed state. It is enclosed in a wrapper 2 of tubular textile material, which for present purposes, may be typified by a knitted tube which is knitted directly over the body 1. The end 3 of the knitted tube extends substantially beyond the adjacent end of the absorbent body 1 to form a draw string in the finished tampon and the other end 4 of the jacket is tucked into the body of the tampon so as to more or less anchor that end of the jacket.

In one practical embodiment, the tampon body 1 in its initial condition, may be in the neighborhood of 4 inches long, 1⅛ inches wide, and about 15/32 inch in thickness.

The initial structure, as represented in Fig. 16, is first subjected to a lengthwise compressing operation, which reduces the length of the body to about 1⅝ inches, the jacket material 2 being, of course, compressed with the body material. The product of this step is represented in Fig. 17.

The second step is to compress the shortened body to reduce its width. The product of this step is represented in Fig. 18, and in the typical example already referred to, the width may be reduced from approximately 1⅛ inches to approximately 7/16 inch.

The initial thickness of the tampon body is next subject to a compressing operation as represented in Fig. 19. The thickness is reduced about 5/32 inch by a suitable compressing die, this operation serving also to partially restore the initial width of the tampon body, as represented in Fig. 19.

A repeated compression of the width is then effected to restore the width to a dimension of approximately 5/16 inch as represented in Fig. 20.

A final compressing step is effected in respect of the thickness, this time to a more limited extent (say about 1/64 inch), mainly for the purpose of facilitating removal of the tampon from the chamber formed by the dies employed for effecting the aforesaid compressing steps. The repeated transverse compressing steps constitute a kneading action on the body which imparts a desirable softness characteristic to it notwithstanding its highly compacted condition. The final minor compression step may add somewhat to the said beneficial kneading effect on the tampon body but because of its small magnitude it does not materially disturb the interlocked condition of the fibers in the tampon body so that the latter remains in its highly compacted condition. The finished tampon is represented in Fig. 21 and is designated T.

These steps of tampon forming result in a tampon in which the fibers of the absorbent body are united or more or less welded together to cause the body to retain its reduced size as represented in Fig. 21. However, the body is not hardened to rigidity but is somewhat soft and is at least slightly flexible and slightly compressible between the fingers of a person's hand. The tampon body so formed is a highly desirable structure and well suited to function as a catamenial tampon.

The method of compressing the tampon body in accordance with the foregoing steps and portions of an apparatus suitable for practicing the method, are represented in Figs. 9 to 15 inclusive. The elements of mechanism shown in these figures are also elements of the complete mechanism, shown in Figs. 1 to 8 inclusive, but a general understanding of the method and operation of the apparatus may be gained from Figs. 9 to 15 inclusive which will now be described.

The uncompressed tampon body with its draw string forming extension 3 is drawn by vacuum into a tubular die opening or compression chamber. The die opening is formed between a lower stationary bed plate 5 on one side and a vertically movable compression member 6. The compression member 6 is slidably mounted in a head member 7, which also cooperates with the bed plate 5 to form part of the chamber in which the uncompressed body is initially received. A top plate 8 which, like the member 7, is in normally fixed relation to the bed plate 5 completes the formation of the top of the chamber. The chamber space between the bed plate and the top of the chamber is closed by extensions of the member 7 and suitable filler strips, and at the front or open end of the chamber, by side compressing dies. A horizontally reciprocable plunger 9 is slidable within the die opening or chamber and said plunger is bored out longitudinally as indicated at 10 to receive the draw string portion 3 of the tampon structure. A vertically movable gate structure 11 comprising upper and lower gate bars 11a and 11b respectively, is associated with the front end of the die chamber. The uncompressed tampon body is initially delivered to the chamber through the front end opening indicated at 12 when the gate is in its open position, as shown in Fig. 9, the bore 10 of the plunger 9 being then connected to a suitable source of vacuum so that the draw string portion 3 of the tampon structure will be drawn into the bore of the plunger while the main body part of the tampon is drawn into the compression chamber to the position substantially illustrated in Fig. 9.

After the tampon body is seated in the die chamber, as represented in Fig. 9, the gate 11 is closed to provide an end wall for the chamber for cooperation with the adjacent end of the bored plunger 10 which is moved endwise toward the gate to effect the longitudinal compression of the tampon body, as represented in Fig. 10.

It is found that this endwise compression causes the production of a higher degree of compression in the draw string end of the tampon body than in its opposite or front end portion. The variation in the degree of compression from the front end to the rear or draw string end of the tampon body becomes progressively greater from the front end of the body to its rear end, and this is probably due to the fact that all of the compression is effected by movement from one end only. Frictional resistance between the surfaces of the tampon and the surrounding walls of the chamber also probably have some significance in the indicated progressively varying degree of compression.

After the lengthwise compression is effected, the plunger 9 temporarily remains in its advanced position, as shown in Fig. 10, and side compressing dies 13 and 14, which form part of the sides of the compression chamber, are moved toward each other from initial positions, as represented in Fig. 11, to advanced positions as represented in Fig. 12. This compresses the tampon body sidewise to a greatly reduced width and the tampon body then appears as shown in Fig. 18. The dies 13 and 14 then return to their open position, as represented in Fig. 13, whereupon the top die 6 moves downwardly to compress the body in the direction of its thickness, the tampon body being thereby flattened and its width partially restored. The top compressing die 6 is then returned upwardly and the side compressing dies 13 and 14 are again actuated to compress the tampon body sidewise, to place the body in the condition illustrated in Fig. 20 which is, in outward appearance, the same as the condition illustrated in Figs. 12 and 18.

A final conditioning step is represented in Fig. 15 wherein the side dies 13 and 14 are again open to their fully open positions and the top die 6 is moved downwardly only a limited extent mainly to reduce the thickness of the tampon structure to slightly less than the vertical depth of the compression chamber or, at least, to cause said thickness of the tampon body to be a freely slidable fit in said tampon chamber. When the tampon has thus been made an easily slidable fit in the compression chamber, compressed air is delivered into the bore of the endwise compressing die so as to effect pneumatic ejection of the finished tampon from the compression chamber. The gate 11 is, of course, open preparatory to such ejection of the tampon out of the same end of the compression chamber that the tampon was delivered into the chamber.

The movable die elements may be actuated mechanically or hydraulically or otherwise, or by a combination of methods. In the apparatus about to be described, the side compression dies are hydraulically actuated and the top compressing die 6 is mechanically actuated. This combination, as will be seen, provides a relatively simple and compact apparatus having a desirable degree of flexibility in respect of pressures employed for compressing purposes, especially in respect of the hydraulically operated side compressing dies.

The apparatus comprises a supporting frame structure 15 having a top plate element 16 suitably mounted on the frame structure. An upstanding rectangular frame-like member 17 (see Fig. 3) is mounted on the table member 16 near the front edge thereof, and said frame structure 17 slidably supports a pair of horizontally aligned and horizontally slidable hydraulic cylinders 18 and 19 respectively. These hydraulic cylinders are respectively rigidly connected to the side compressing dies 13 and 14, and they are supported for said horizontal movement by means of the upper and lower guide blocks 20 and 21 respectively.

Pistons for the hydraulic cylinders 18 and 19 are fixed, the same being anchored by suitable connections, as indicated at 22, 22 to the ends of said frame 17. The piston for the cylinder 19 is illustrated at 23 in Fig. 12, the anchoring connection to the frame 17 connecting the piston rod 24 which is slidable in a suitable bearing provided in the piston head 25 which is detachably fitted to one end of the cylinder 19, the other end of which cylinder is closed by an integrally formed end wall or head. The piston rod 24 and its extension 22 are bored out, as represented at 26 (in Figs. 2 and 12) and actuating fluid is delivered into the closed end of the cylinder through said bored stationary piston rod. Suitable pipe lines, indicated at 27 and 28, connect the cylinders 18 and 19 respectively to a valve 29 (Fig. 1) through which fluid under pressure is delivered through said pipelines and into said hydraulic cylinders.

It will be seen then that when fluid under pressure is delivered through the piston rod ports 26 into the inner or closed end of the respective cylinders, the cylinders will be forced to move inwardly; that is to say, in such a direction that the compressing dies 13 and 14 will be moved toward each other to compress the tampon as represented in Fig. 12.

To withdraw the compressing dies 13 and 14, fluid is delivered under pressure into the cylinder space outwardly of the respective pistons through inlet ports or connections, such as represented at 30, which are connected through suitable tubes and pipelines represented at 31 and 32 to the valve 29. Substantial pressure is employed and it is preferred that separate pumps be employed for supplying the pressure fluid to the respective cylinders. Pairs 33 and 34 of pump to valve conduits are shown for conducting the pressure fluid from the pump to the valve and return.

The valve structure 29 is a commercially available device, the details of which form no part of the present invention wherefor such details are not shown. However, the said valve includes a core or piston 35 which is reciprocated to make the required change in connections to cause oil to be delivered under pressure, first to the inner end of each cylinder while venting the outer ends thereof, and then to the outer ends of the cylinders while venting the inner ends thereof. The movements of the valve core 35 are cam controlled as best shown in Fig. 6, from which it can be seen that a rotary cam 36 provided with a pair of lobes or rises 37 and 38 acts on the cam following roller 39 of a rock arm 40 to actuate said valve. The cam following roller 39 is mounted on one end of said rock arm 40 which is pivoted intermediate its ends, as shown at 41, the other end of the arm being provided with a laterally upwardly extending lug or ear 42, which carries an inwardly and outwardly adjustable abutment element 43 for engaging a part of the valve structure.

Said valve structure, as best shown in Fig. 22, consists of upper and lower units 29a and 29b, which are fixedly secured to an intervening mounting member 29c. The mounting member 29c is supported in fixed position by means of an angle bracket 29d, which is secured to the top plate 16. Said valves respectively have cores 35a and 35b, which have projecting end portions suitably slotted to receive the ends of a cross arm or cross head 44 which is integral with a post 45 that is slidable in a suitable socket provided in the mounting element 29c. The cross head 44 has a lug 46 which carries a roller 47 which is engaged by the adjustable element 43 carried by the adjacent end of the valve actuating rock arm 40.

It will be seen that rocking movement of the arm 40 is imparted through the roller 47 and cross head 44 simultaneously to both units of the valve structure 29. The described details of the valve arrangement and of the valve operating mechanism facilitate the employment of the described commercially available valve structure. The arm 40 is pivoted intermediate its ends as best shown in Fig. 5 on pivot pin 41 which is supported in the table top 16 and in a strap or bar 48 which is supported in upwardly spaced relation to the table top 16 by suitable end supports, as shown in Fig. 2.

The bed plate 5 previously referred to, is the main die block and it is of elongated form as shown in Figs. 7 and 8. It is suitably mounted in the rectangular frame 17, being seated on the lower arm thereof. Said main die block is channeled longitudinally, as indicated at 49 (Figs. 7 and 8) for slidably receiving the compression plunger 9, and its forward end is provided with a transverse channel 50 in which the side compressing dies 13 and 14 move. A cover plate 51 placed over the top of the die block 5 closes the top of said channel 49. The previously mentioned head member 7 is seated on top of the forward portion of the main die block 5 and constitutes a top die block. This top die block 7 has a guideway 52 therein which slidably receives the top compression plunger 6 and the main die block 5 extends forwardly under the plunger 6 to provide, in effect, an opposed, stationary compression jaw face 53. The plunger 6 is also movable through suitable openings indicated at 54 and 55 respectively in the top arm of said frame 17 and a frame plate 56 which has its forward end portion mounted on said upper arm.

The plunger 9 is in the form of an elongated arm which has its rearward portion seated on and interconnected to a slide block 57. The slide block 57 is slidably mounted on the member 48 between parallel guides 58, 58 which are suitably rabbeted to receive flange portions which extend from the opposite sides of the slide block 57. The rear end portion of the plunger 9 may be detachably connected to said slide block 57 by a key 9a and bolts 9b.

For actuating the slide block 57 and the compressing die or plunger 9, the slide block has pivoted to its upper face, an arm 59, one end of which is connected by a stout tension spring 60 to an anchoring bracket 61 which is secured to the rear side of the main frame structure 15 (see Fig. 2). The other end of said arm 59 is pivotally connected, as indicated at 62, to an end of a rock arm 63, the other end of which is pivoted on a fixed pivot or post 64 which is supported in side portions of the table plate 16 and top plate 56 (see Fig. 5).

Said arm 63 is provided intermediate its ends with a roller 65 which engages the periphery of a rotating cam 66, the latter being carried by an axially vertical cam shaft 67 which is suitably journaled and supported in bearings on the top plate 56, table plate 16, and the frame structure.

It will be seen that the spring 60 which is normally under tension, serves to yieldingly hold the end compressing die or plunger 9 in the retracted position in which it is illustrated in Figs. 7 and 8, and that the cam 66 will act to rock the arm 63 and thereby to advance the said end compressing die 9.

Vacuum pump and compressing air supply connections are made to the passageway 10 in the end compressing die 9 by means of a flexible conduit 68 which is provided at one end with a fitting which is screwed into a suitably tapped opening in the rear end portion of the compressing die 9, as best shown in Figs. 7 and 8. The other end of said flexible conduit 68 is connected to a port or connection 69 of a three-way valve 70 (Fig. 1). Said three-way valve has a second port connected by means of a conduit 71 to a suction pump and another port connected by means of a conduit 72 to a source of compressed air.

A plunger or core 73 forming part of the three-way valve is reciprocable in the valve structure 70 to alternately effect intercommunication of the suction and compressed air lines 71 and 72 respectively with the conduit 68. Said valve 70 is actuated by means of a cam 74 carried by the cam shaft 67. The suction line 71 is normally maintained in communication with the conduit 68 and the bore of the end compression die or plunger 9, and compressed air is delivered to said plunger 9 only momentarily for the purpose of ejecting the tampon as already described. Hence, the cam 74 is a substantially circular disc having only a short rise 75 for compressing the valve core inwardly for only a short time period or interval during which compressed air is being employed to eject a finished tampon in the manner hereinabove explained.

The gate 11 which is periodically closed from the open position illustrated in Figs. 8 and 9 to the compression chamber closing position illustrated in Fig. 10, comprises the aforesaid upper and lower gate members 11a and 11b which are vertically slidably mounted and simultaneously reciprocated in opposite directions to and from open and closed positions. The lower gate 11b is slidable vertically in a guideway provided on the front end of the bed plate 5 (see Figs. 7 and 8) and by a retainer 5a, and it is secured to the upper end of a rod 76 which is vertically slidable in suitable bearing openings provided in the lower arm of the frame 17 and in the table plate 16. At its lower end, said rod 76 is equipped with a cross pin 77 and with a laterally extending roller 78 (see Figs. 2, 3 and 4). A pair of coiled tension springs 79, 79 are stretched between the ends of the cross pin 77 and suitable anchoring pins 80 which are secured to the frame of the machine, these springs serving to normally urge the post or rod 76 and the gate member 11b to move upwardly to closed position.

The roller 78 on the lower end of the rod 76 cooperates with a cam lug 81 which depends from the free end of the arm 82 of a bell crank lever, which is rockably mounted on a frame supported pivot post 83. Said bell crank lever also has an arm 84 which is provided with a roller 85 which roller cooperates with the periphery of a rotary cam 86 carried by the above mentioned cam shaft 67. A spring 87 stretched between a portion of the bell crank arm 82 and a frame carried anchoring pin (not shown) serves to normally urge the bell crank to rock in such a direction that its cam following roller 85 is held in engagement with the actuating cam 86. The cam lug 81 of the bell crank arm is thereby also caused to force the roller 78, the rod 76 and the lower gate 11a downwardly to the open position of the gate. The cam 86 is, of course, so timed that the gate 11b will be elevated to its closed position during the tampon compressing operations, and opened to permit ejection of the finished tampon and delivery of an uncompressed body to the empty chamber.

The upper gate is slidable in a guideway provided on the front of the top die block 7 and a retainer 7a (Figs. 3 and 8) and it is secured to a rod 76a which extends through a guiding hole in the upper arm of the frame part 17. The upper end of the rod 76a is pivoted to one end of a lever 76b which is pivoted intermediate its ends on said upper arm of the part 17. The other end of the lever 76b is pivoted to the upper end of a rod 76c which has its lower end anchored to an arm 76d which is rigid with and projects laterally from the lower gate rod 76. When the lower gate 11b is moved upwardly, the upper gate 11a will move downwardly in equal distance, the adjacent ends of the gate meeting at substantially the vertical middle of the compression chamber to close the front end thereof.

The top compression die 6 is in the form of an elongated rectangular bar and it is mechanically actuated by mechanism located above the top plate 56 (see Figs. 1, 2, 3 and 8).

Said top compressing die 6 extends upwardly beyond the top plate 56 and the upper end of said top compressing die is provided with a transverse groove or recess 88 (Figs. 2 and 8) which receives a roller 89 which is carried by one end of a lever 90. The lever 90 is rockably mounted intermediate its ends on a pivot pin or shaft carried by suitable supporting brackets 91, 91 which are mounted on the top of said top plate 56. The other end portion 92 of said rock arm 90 is located under a lug or ear 93 which extends laterally from a rock arm 94 which has one end pivotally mounted on the pivot pin or shaft 95, which also rockably supports said rock arm 90. Said lever 94 has its free end overlying a heavy coil spring 96 which is normally under substantial compression so as to urge the adjacent end of the lever 94 to move upwardly about the axis of the pivot shaft 95.

A roller 97 carried by said lever 94 engages the lower face of a rotary cam 98 which is carried by the upper end of the cam shaft 67. Said lower face of the rotary cam 98 is suitably shaped to normally hold the adjacent end of the lever 94 down against the expansive pressure of the spring 96. A recessed portion 99 of the cam 98 serves to periodically permit said spring 96 to rock the lever 94 upwardly.

Upward movement of the lever 94 is transmitted to the end portion 92 of the rock arm 90 by means of a bolt 100 which fits slidably through an opening in the lug 93 but is screw threaded or otherwise anchored in the end portion 92 of the rock arm 90. Upward movement of the end portion 92 of the rock arm 90 is, of course, translated by the rock arm into downward movement of the top compressing die or plunger 6.

It is preferable that the upward movement of the top compressing die 6 be terminated so that the lower end 101 of said die will be accurately aligned with the bottom face of the top die block 7 so as to provide a smooth top surface for the compression chamber whereby insertion of the tampon body and discharge of the finished tampon are facilitated.

In order to accurately limit the upward movement of the die 6 to so position its lower end, an inverted U-shaped frame 102 is mounted on the top plate 56 so as to straddle the upper end portion of said die 6. A stop screw 103 is threaded through the top of said frame 102 so that the lower end of the screw will engage the upper end of the top die 6 to limit its upward movement as aforesaid. The stop screw 103 may, of course, be provided with a lock nut or other suitable locking means to hold it in selected position of adjustment.

Any change made in the setting of the stop screw 103 will, of course, effect a corresponding change in the rest position of the end portion 92 of the rock arm 90. Such changes in the position of said end portion 92 relative to the normal position of the lever 94 are permitted by the sliding fit of the bolt 100 through the lug 93 of said lever 94.

When the cam 98 engages the roller 97 to effect downward movement of the lever 94, such movement is transmitted to the rock arm 90 through the agency of a compression spring 104 which is disposed around the bolt 100. In the event that the top compressing die 6 becomes jammed or stuck in a down position, the spring 104 will yield to permit the lever 94 to continue its downward movement to its full down position even though the rock arm 90 is locked by its connection to the die against corresponding rocking movement.

To facilitate delivery of an uncompressed tampon body to the compression chamber and to receive and conduct the finished tampon away from the apparatus, the delivery and receiving structure shown best in Figs. 1, 2, 3 and 8, is provided. As there shown, a bracket 105 is secured to the front central part of the main die block 5 through the retainer 5a which straddles the gate 11 and is directly secured to portions of said die block on opposite sides of said gate.

A trough-like chute or conveyor 107 is mounted on a plate or ledge part 108 of said bracket 105, and said trough is aligned with the compression chamber so that when a finished tampon is pneumatically ejected from the chamber the tampon will be discharged into said trough. The trough may have an inclined portion which will conduct the finished tampon by gravity to a receiver where a conveyor belt or other means may be provided for conducting the discharged tampons to other receiving means or mechanisms.

A delivery chute or tray 109 is pivoted, as indicated at 110, on ears or the like, which extend upwardly from the bracket plate 108, the other end of said tray 109 being disposed adjacent the front of the main die block 5 and said upper die block 7. The tray 109 is adapted to be rocked vertically about its pivot mounting 110 for which purpose it has its free end connected by a link 111 to one end of an arm 112 which is pivoted on a fixed pivot 113 carried by a rear portion of the top plate 56.

Said arm 112 has a roller 112a which cooperates with a cam formation 114 on the top of said rotary cam 98 whereby the arm 112 is rocked up and down as an incident to rotation of said cam 98. The cam 114 is so formed and so timed that during most of the cycle of operation of the compressing apparatus, the delivery tray 109 will be supported in a substantially horizontal position, as represented in dotted lines in Fig. 2. When the tray is in that position an uncompressed tampon body, such as represented in Fig. 16, may be either manually or automatically deposited in the tray with its withdrawal string 3 toward the mouth or entrance to the compression chamber. After a finished tampon is ejected from the compression chamber, the cam 114 operates to lower the tray 109 so as to cause its free end which is open, to communicate with the mouth opening of the compression chamber. Then when the compression chamber is placed in communication with a suction pump by the valve mechanism already described, the tampon body in the delivery tray 109 will be sucked out of the tray 109 and into said compression chamber, the draw string part of the tampon structure being pulled into the bore of the compression plunger 10.

It is, of course, preferable that the tampon body be deposited in the delivery tray 109 so that it is fairly close to the mouth end of the compression chamber, thereby to enable the air current flowing through the compression chamber to readily carry said tampon body into the compression chamber. However, the tampon bodies are very light and offer but little resistance to movement over the length of the delivery tray 109 so that the combination of an air current entering the compression chamber and the angular position of the tray in delivery position is effective to cause the uncompressed tampon bodies to enter the compression chamber as explained.

A cycle of operation of the mechanism described is substantially as follows:

An uncompressed tampon body having been delivered to the feed tray 109, the feed tray is lowered to communicate with the mouth of the compression chamber and the suction is turned on. The uncompressed tampon is then drawn into the compression chamber and the end compression die or plunger 9 is retracted to aid in the movement of the tampon body into the chamber. The end compression die 9 may, however, be preliminarily retracted if desired.

The end gate 11 is then closed and the end compression die 9 advanced to effect endwise compression of the tampon body, this being the step represented in Fig. 10. The stroke of the compression die 9 is made sufficient to move the tampon body in its entirety outwardly into engagement with the closed gate 11 and to reduce the length of the tampon body to the desired finished size. In this instance, the tampon body is compressed lengthwise to somewhat less than half its initial length, and it is found that the density of the tampon body so compressed varies from its string end to its opposite or front end, the density being greater at its string end and progressively being reduced towards the front end of the tampon body.

After the endwise compression is completed, the end compression die 9 remains temporarily in its compressing position as shown in Fig. 10, and the side compression dies 13 and 14 are moved towards each other to compress the tampon body transversely, as represented in Fig. 12. In one practical embodiment the uncompressed tampon body has cross sectional dimensions of approximately 1⅛ inches by 15/32 inch. Such a body is compressed transversely to a width of approximately 7/16 of an inch. Such compression is effected with pressure which is high enough to cause the fibers of the tampon body to become more or less welded together so that the body will remain nearly in its compressed condition. The pressure required may vary somewhat due to variation in the characteristics of the body material and perhaps other operating conditions, but in general, the pressure should be from 2,000 to 6,000 pounds per square inch.

After the initial side compression is effected, the side compressing dies 13 and 14 are retracted and the top compressing die 6 is lowered to reduce the thickness of the compressed body nearly to half its original thickness, as represented in Fig. 13. The tampon body thereby has its initial width partially restored and the body is to some extent worked or kneaded.

The top compressing die 6 is then withdrawn and the side compressing dies 13 and 14 again moved inwardly to, for the second time, compress the tampon body transversely of its width, as shown in Fig. 14. Thereafter the side compressing dies are again opened and the top compressing die 6 lowered to a limited extent as shown in Fig. 15 primarily to reduce the thickness of the tampon body sufficiently to facilitate its ejection pneumatically from the compression chamber.

The cam 98, which controls the top compression die, is of course provided with a pair of suitably spaced recesses, one of which is represented at 99, to effect the successive downward movements of the top compressing die in the required timed relationship.

Upon completion of the compressing operations and the final top compressing operation, the gate 11 is opened and compressed air is delivered into the compression chamber to eject the finished tampon.

As shown in Fig. 25, the finished tampon T may be mounted in an applicator tube 115. The applicator tube 115 is preferably of somewhat larger internal diameter than the main body portion 116 of the tampon so that said main body portion may be easily inserted into the applicator tube 115 from its open front end 117. A front end portion 118 of the tampon is, however, preferably expanded in diameter so as to cause an end portion of the tampon to fit snugly in the tube and to be thereby frictionally retained in the tube. Also, the front end of the tampon is desirably provided with a mushroomed or further enlarged end portion 119 which extends over the end wall 120 of the applicator tube so as to protect the walls of the vaginal cavity from engagement by the relatively hard material of the applicator tube.

The more or less flanged end portion 119 of the tampon may be made somewhat softer than the remainder of the tampon so as to provide an especially soft or cushion-like end portion which can rub across the walls of the vaginal cavity without danger of injuring the same. The flared portion 118 should be so formed as to provide sufficient frictional grip on the inside of the applicator tube 115 to prevent the tampon from accidentally dropping out of the tube while at the same time permitting the tampon to be easily ejected from the applicator tube by means of an ejector tube such as represented at 121. The drawstring 3 of the tampon is preferably received within the applicator tube and ejector tube as shown.

To form the flared portion 118 and flanged end portion 119 of the tampon, the compressed tampon may be subjected to special operations after compression of the body, but these formations may also be formed as a part of the compressing operations.

To form the expanded and flanged portions of the tampon, as a part of the operation of compressing the tampon body, the side compressing dies 13 and 14 (see Fig. 24) have their respectively adjacent cooperating faces 13a and 14a respectively concavely arched to correspond substantially with the required more or less cylindrical form of the main body portion 116 of the finished tampon. End portions of the dies are relieved or beveled as indicated at 13b and 14b to approximately correspond with the desired flare of the portion 118 of the finished tampon. The said beveled portions 13b and 14b are, of course, also concavely arched to substantially conform to the frusto-conical form of said flared tampon portion 118.

To form the flanged end portion 119, the gates 11a and 11b (see Fig. 23) have their faces, against which the tampon is compressed longitudinally, recessed as indicated at 122 and 123, these recesses having central portions which together define an approximately circular area corresponding to the flange end portion 119 of the tampon. These recesses 122 and 123 are elongated in the direction of travel of the side compressing dies 13 and 14 so that the recess 122 has extended end portions 122a and 122b, and the recess 123 has extended end portions 123a and 123b. These sidewise extensions of the recesses 122 and 123 permit the extreme end portion of the tampon adjacent the gates to maintain a flared relationship to the remainder of the tampon during the tampon formation steps represented in Figs. 17 and 19 in which the tampon body is flattened and spread laterally considerably beyond the normal diameter of the ultimate cylindrical form of the tampon body. By employing separable gates 11a and 11b, it remains possible to open the gates by simple sliding movement after a tampon has been compressed against such gates.

It will be evident that the open-sided recesses 122 and 123 do not provide positive control for the formation of the end flange 119 in the side areas in which said recesses are open. This, however, is not a disadvantage inasmuch as it is not essential that any control be exercised as to the extent to which the extreme end portion of the tampon body will spread, this being more or less automatically taken care of by the character of the absorbent material employed in forming tampon bodies. Absorbent cotton or absorbent cellulosic material, which is generally employed to produce the tampon bodies, is readily moldable under pressure, but it does not flow freely, and even the high pressures employed for compressing the tampon body lengthwise and transversely as already indicated, will cause only limited flanging of the end portion of the body into recesses such as 122 and 123 beyond the adjacent ends of the side compressing dies 13 and 14. Hence, even though the recesses 122 and 123 are open at their sides, and even though the central portions of such recesses were made to define an area having a diameter considerably larger than the diameter of the flanged end of the tampon, a satisfactory end flange would be produced. However, it is preferred that the central areas of the recesses 122 and 123 be so formed as to define a circular area of a diameter substantially corresponding to the size of the desired flanged end of the tampon.

When a tampon is formed in the manner hereinabove set forth, that is to say, by first compressing an absorbent body lengthwise and subsequently compressing it transversely to such an extent that the body will become stabilized in its reduced, compressed condition, an advantageous effect is obtained on the density of the tampon body. It is found that the density of the body will vary more or less gradually from the rear or outer end portion of the body, i. e., its drawstring end, to a lesser density at its front or inner end. This variation in density is accompanied, especially in the expanded portion 118 (Fig. 25), with increased resiliency, said portion 118 being noticeably more resilient than the main elongated portion 116 of the tampon body. Because of this greater resiliency in the expanded portion 119, frictional seating of the tampon in the applicator tube 115 is very effective notwithstanding the looseness of fit of the main body portion 116 in said applicator tube.

The described order of compression has the further advantage that the transverse compression tends to lock the fibers of the body against longitudinal re-expansion so that when the tampon is subjected to wetting as when placed in use, there is pronounced tendency for the tampon to expand transversely to a considerable degree before any substantial degree of longitudinal re-expansion can take place. This initial transverse expansion is highly desirable in that it tends to cause the tampon to quickly expand and fill up the portion of the passageway in which it is seated, thereby to prevent the leakage or free passage of menstrual fluid along the walls of the vaginal canal past the tampon body.

The lesser density of the front or inner end of the body also promotes more rapid absorption of fluid in that end portion to thereby accelerate said tendency of the body to quickly re-expand transversely.

From the foregoing it can be seen that the described tampon structure possesses some important and advantageous characteristics in respect of its initial softness notwithstanding its high degree of compaction, the facility with which it may be assembled into an applicator, and its rapid absorbing and expanding characteristics under normal conditions of use.

The mechanism for compressing the tampon, including the feeding of the tampon into the compressing mechanism and its discharge therefrom is automatic in operation, but of fairly simple construction considering the sequence of operations which are automatically performed.

The described apparatus consists of a single, stationary compressing unit but it will be apparent that the described unit may be movably mounted, as for example, on a turret with a plurality of other similar units to provide a turret type rotary machine in which a plurality of tampon units are being simultaneously acted upon. In such a multiple unit, the cams which actuate the various elements may be stationary instead of rotary as here described, the actuated mechanism traveling about the cams instead of being stationary as herein illustrated and described.

Various changes in the details of the described product, method and mechanism may be made while employing the principles of the invention.

We claim:

1. Tampon compressing apparatus, comprising a die block having an elongated compression chamber therein for receiving an uncompressed elongated tampon body, said compression chamber having one end open for permitting introduction of an uncompressed tampon body into the chamber and ejection of a finished tampon from the chamber, a gate for closing said open end, a longitudinal compression plunger movable longitudinally in said chamber through the other end thereof, means for moving said plunger toward said gate when in closed position to effect longitudinal compression of a tampon body introduced into said chamber as aforesaid, valved connections from said chamber to sources of compressed air and air suction, and means for actuating the valves in said connections for successively effecting suction into said chamber through said open end thereof when said gate is in open position to thereby facilitate introduction of an uncompressed tampon body into said chamber, and an air flow outwardly from said chamber through said open end for pneumatically ejecting a tampon body compressed in said chamber.

2. Apparatus for compressing an elongated uncompressed tampon body, comprising a die block having an elongated chamber therein for receiving an elongated uncompressed tampon body, one end of said chamber being open and constituting an entrance to said chamber, an elongated, tubular, end compression plunger entering the other end of said chamber and movable lengthwise therein for effecting endwise compression of an uncompressed tampon body positioned in said chamber, means for effecting a flow of air into and through said chamber from said entrance and outwardly from said chamber through said tubular end compression plunger to facilitate introduction of an uncompressed tampon body into said chamber, a movable gate for closing said entrance, means for moving said gate to and from closed position relative to said entrance, means for advancing said plunger when said gate is closed to thereby effect endwise compression of a tampon body against said gate, and means for establishing a flow of air through said tubular plunger and chamber and out of said entrance to thereby eject a compressed tampon body from said chamber.

3. Apparatus, according to claim 2, wherein the uncompressed tampon bodies are provided with draw strings which extend endwise from one end thereof, and wherein the bore of the tubular plunger is of such size as to be capable of receiving said draw string as an incident to the air flow by which the tampon body is introduced into said chamber, whereby compression of the tampon body is effected without also compressing said draw string into the tampon body.

4. Apparatus, according to claim 2, wherein cam actuated means is provided for positively effecting the tampon compressing movement of said end compression plunger, and wherein spring means is provided for effecting retractive movement of said plunger.

5. In tampon compressing apparatus, the combination of a die block having an elongated compression chamber therein, an end compression plunger movable lengthwise in said chamber for longitudinally compressing a tampon body in said chamber, said plunger serving to close one end of said compression chamber, the other end of said compression chamber being open and constituting an entrance and exit for said chamber to permit insertion and removal of tampon bodies into and from said chamber, a gate for closing and opening said entrance and exit end of the chamber, a pair of side compression dies disposed opposite one another and movable toward and from each other and into and out of said compression chamber to compress a tampon body transversely of its length, a top compression plunger movable into and out of said compression chamber transversely of the direction of movement of said pair of side compressing dies and transversely of the length of said tampon body, cam actuated means for advancing said endwise compression plunger, hydraulic means for actuating said pair of side compression dies, mechanical means for actuating said top compression plunger, and cam means for controlling the operation of said hydraulic means.

6. Apparatus, according to claim 5, wherein an air passageway is provided in said end compression plunger and wherein there is provided a conduit communicating at one end with said passageway and having at its other end, connections with sources of suction and compressed air, cam actuated valve means in said conduit for controlling said suction and compressed air connections, said cam actuated means being operative to produce a flow of air from said entrance and exit end of the die chamber into said die chamber for facilitating delivery of an uncompressed tampon body into said die chamber, and to effect the delivery of compressed air into the plunger end of said die chamber to effect pneumatic discharge of a compressed tampon from said chamber.

7. Tampon compressing apparatus, according to claim 2, wherein the means for closing the gate is a yielding means.

8. Apparatus, according to claim 5, wherein the mechanical means for actuating said top compression plunger comprises a pivotally mounted arm, a spring normally urging said arm to rock in one direction, cam means for controlling the movement of said arm under the action of said spring and for returning the arm to a starting position against the force of said spring, and a connection from said arm to said top compression plunger whereby the latter is moved in compressing direction under the force of said spring and retracted by the action of said cam.

9. Apparatus, according to claim 5, wherein the mechanical means for actuating said top compression plunger comprises a pivotally mounted arm, a spring normally urging said arm to rock in one direction, cam means for controlling the movement of said arm under the action of said spring and for returning the arm to a starting position against the force of said spring, and a connection from said arm to said top compression plunger whereby the latter is moved in compressing direction under the force of said spring and retracted by the action of said cam, said last mentioned connection comprising a rock lever having one end connected to said top compression plunger and its other end positively connected to said arm for movement as a unit therewith in tampon compressing direction and having a yielding connection with said arm for permitting plunger elevating movement of said arm independently of movement of said rock lever in the event that said plunger becomes locked against upward movement.

10. The method of making a compressed tampon body which comprises the steps of providing an uncompressed body having a thickness which corresponds approximately to the desired thickness of the compressed tampon and a width which is substantially greater than the corresponding dimension of the finished tampon, compressing the width of the body to approximately the desired tampon width, then compressing the thickness of the body to substantially less than the desired thickness while permitting the body to re-expand in the direction of its width, then re-compressing the width of the body to substantially the desired width, and then effecting a slight second compression of the thickness of the body.

11. Apparatus for compressing an elongated tampon body, comprising a die block having an elongated chamber open at one end so as to permit the introduction of an uncompressed tampon body into the chamber, a gate for closing said open end of the chamber, and a compression plunger movable in said chamber toward said gate to effect compression of said body against said gate, the latter comprising a pair of gate members movable toward each other from opposite sides of the open end of said chamber, and means for opening and closing said gate.

12. Apparatus for compressing an elongated tampon body, comprising a die block having an elongated chamber open at one end so as to permit the introduction of an uncompressed tampon body into the chamber, a gate for closing said open end of the chamber, and a compression plunger movable in said chamber toward said gate to effect compression of said body against said gate, the latter comprising a pair of gate members movable toward each other from opposite sides of the open end of said chamber, said gate members being provided with recesses facing said chamber to receive portions of the material under the pressure of said plunger, and means for opening and closing said gate.

13. Tampon compressing apparatus of the class described, comprising a die block provided with an elongated compression chamber having one end open to provide access to said chamber, a pair of gates movable toward each other from opposite sides of the open end of said chamber to close said open end, said gates having end walls adapted, in the closed position of the gates, to abut one another within the open end area of said chamber, a plunger movable lengthwise in said chamber for compressing material therein against said gates when closed, a pair of side compressing dies movable into said chamber adjacent said gates and having cooperating faces to transversely compress material in said chamber, said gates having recesses therein adapted to receive some of the material under the pressure of said plunger, and said recesses extending laterally beyond the cooperating faces of said side compression dies when in compressing position to thereby form a laterally projecting end flange on an end of the compressed material.

14. Tampon compressing apparatus of the class described, comprising a die block provided with an elongated compression chamber having one end open to provide access to said chamber, a pair of gates movable toward each other from opposite sides of the open end of said chamber to close said open end, said gates having end walls adapted, in the closed position of the gates, to abut one another within the open end area of said chamber, a plunger movable lengthwise in said chamber for compressing material therein against said gates when closed, a pair of side compressing dies movable into said chamber adjacent said gates and having cooperating faces to transversely compress material in said chamber, said gates having recesses therein adapted to receive some of the material under the pressure of said plunger, and said recesses extending laterally beyond the cooperating faces of said side compression dies when in compressing position to thereby form a laterally projecting end flange on an end of the compressed material, said recesses in said gates being elongated in the direction of movement of said side compression dies.

15. Tampon compressing apparatus of the class described, comprising a die block provided with an elongated compression chamber having one end open to provide access to said chamber, a pair of gates movable toward each other from opposite sides of the open end of said chamber to close said open end, said gates having end walls adapted, in the closed position of the gates, to abut one another within the open end area of said chamber, a plunger movable lengthwise in said chamber for compressing material therein against said gates when closed, a pair of oppositely disposed side compression dies adjacent said gates, said dies having cooperating faces and being movable transversely of the length of said chamber and towards each other into said chamber to transversely compress material in said chamber, said gates having recesses therein adapted to receive some of the material under the pressure of said plunger, and said recesses extending laterally beyond the cooperating faces of said side compression dies when in compressing position to thereby form a laterally projecting end flange on an end of the compressed material, said recesses in said gates being elongated in the direction of movement of said side compression dies.

16. Tampon compressing apparatus of the class described, comprising a die block provided with an elongated compression chamber having one end open to provide access to said chamber, a pair of gates movable toward each other from opposite sides of the open end of said chamber to close said open end, said gates having end walls adapted, in the closed position of the gates, to abut one another within the open end area of said chamber, a plunger movable lengthwise in said chamber for compressing material therein against said gates when closed, a pair of oppositely disposed side compression dies adjacent said gates, said dies having cooperating faces and being movable transversely of the length of said chamber and towards each other into said chamber to transversely compress material in said chamber, the cooperating faces of said side compression dies having opposed end portions adjacent said gates angularly offset to form a funnel-like flare between said faces, thereby to provide the bodies compressed between said dies with flared portions, said gates having recesses therein adapted to receive some of the material under the pressure of said plunger, and said recesses extending laterally beyond the cooperating faces of said side compression dies when in compressing position to thereby form a laterally projecting end flange on the flared end of the compressed material.

17. Apparatus for compressing an elongated tampon body, comprising a die block having an elongated chamber open at one end so as to permit the introduction of an uncompressed tampon body into the chamber, a gate for closing said open end of the chamber, a longitudinal compression plunger movable in said chamber toward said gate to effect compression against said gate of a tampon body introduced into said chamber as aforesaid, a pair of compression dies movable transversely of said chamber toward and from each other into and out of said chamber to compress the tampon body in said chamber, said dies having cooperating faces provided with mutually opposed end portions adjacent to said gate angularly offset to form a funnel-like flare which expands toward said gate, and said gate comprising a pair of members movable toward each other from opposite sides of the open end of said chamber into mutually abutting, closed position, said gate members being provided with cooperating recesses facing said chamber to cooperatively receive an end portion of the material under the pressure of said longitudinal compression plunger, and means for opening and closing said gate and for actuating said compression plunger and dies.

18. Apparatus for compressing an elongated tampon body, comprising a die block having an elongated chamber open at one end so as to permit the introduction of an uncompressed tampon body into the chamber, a gate for closing said open end of the chamber, a longitudinal compression plunger movable in said chamber toward said gate to effect compression against said gate of a tampon body introduced into said chamber as aforesaid, a pair of compression dies movable transversely of said chamber toward and from each other into and out of said chamber to compress the tampon body in said chamber, said dies having cooperating faces provided with mutually opposed end portions adjacent to said gate angularly offset to form a funnel-like flare which expands toward said gate, and said gate comprising a pair of members movable toward each other from opposite sides of the open end of said chamber into mutually abutting, closed position, said gate members being provided with cooperating recesses facing said chamber to cooperatively receive an end portion of the material under the pressure of said longitudinal compression plunger, said recesses extending beyond the walls of the adjacent ends of the flared portions of said dies, and means for opening and closing said gate and for actuating said compression plunger and dies.

19. In apparatus of the class described, the combination of a die block having a compression chamber therein, said chamber having an access opening in a wall of said die block, means for effecting the flow of inwardly and outwardly directed air currents into and out of said die chamber through said opening for facilitating delivery of a tampon body into said die chamber and discharge of such body from said chamber, a delivery chute having a discharge portion movable transversely of said opening into and out of registry therewith, means for moving said delivery chute into registry with said opening when an air current is caused to flow into said chamber as aforesaid for delivering a tampon body into said chamber, said last mentioned means being also operative to move said chute out of registry with said opening when an air current is caused to flow out of said chamber as aforesaid, thereby to facilitate discharge of tampon bodies from said chamber clear of the path of travel of tampons on said chute for delivery to said chamber.

20. Apparatus for making transversely compressed tampons, comprising a pair of mutually opposed elements at least one of which is movable toward and from the other and which elements are normally disposed in mutually spaced relation to form a compression chamber therebetween, a pair of mutually opposed die members at least one of which is movable in said chamber toward and from the other of said die members to compress a tampon body in one transverse direction while said body is confined between said chamber forming elements, said die members being normally disposed in mutually spaced relationship wherein said movable element is movable between said die members for compressing said tampon in another transverse direction, and means cyclically operative to actuate said die members to effect transverse compression of a tampon body in one direction, said movable element to effect substantial transverse compression of said tampon body in another direction, said die members to again effect transverse compression of the tampon body in the first mentioned direction, and again said movable element to a restricted extent to only slightly compress the tampon body to a free fit between said mutually opposed elements when in said normal spaced relation, thereby to facilitate ejection of the tampon from the compression chamber formed between said elements.

References Cited in the file of this patent

UNITED STATES PATENTS

| Number | Name | Date |
| --- | --- | --- |
| 2,076,339 | Voss | Apr. 6, 1937 |
| 2,120,328 | Ferngren | June 14, 1938 |
| 2,166,665 | Parker | July 18, 1939 |
| 2,340,311 | Donovan | Feb. 1, 1944 |
| 2,402,848 | Senn | June 25, 1946 |
| 2,433,675 | Parish | Dec. 30, 1947 |
| 2,450,138 | Harwood | Sept. 28, 1948 |
| 2,458,685 | Crockford | Jan. 11, 1949 |
| 2,464,310 | Harwood | Mar. 15, 1949 |

FOREIGN PATENTS

| Number | Country | Date |
| --- | --- | --- |
| 447,076 | Germany | July 15, 1927 |